United States Patent [19]

Sharp

[11] Patent Number: 4,708,015

[45] Date of Patent: Nov. 24, 1987

[54] STORAGE TANKS WITH SECONDARY CONTAINMENT MEANS AND NON-VISUAL LEAK DETECTION MEANS

[76] Inventor: Bruce R. Sharp, 4090 Rose Hill Ave., Cincinnati, Ohio 45229

[21] Appl. No.: 791,578

[22] Filed: Oct. 25, 1985

Related U.S. Application Data

[63] Continuation-in-part of Ser. No. 740,869, Jun. 3, 1985, Pat. No. 4,607,522, which is a continuation-in-part of Ser. No. 544,013, Oct. 21, 1983, Pat. No. 4,523,454, and a continuation-in-part of Ser. No. 580,800, Feb. 16, 1984, Pat. No. 4,524,609, which is a continuation-in-part of Ser. No. 544,012, Oct. 21, 1983, abandoned.

[51] Int. Cl.[4] .............................................. G01M 3/26
[52] U.S. Cl. ..................................... 73/49.2; 340/605
[58] Field of Search ................... 73/49.2, 49.3, 40.5 R; 340/605

[56] References Cited

U.S. PATENT DOCUMENTS 4,561,292  12/1985  Pugnale et al. ................. 340/605 X

FOREIGN PATENT DOCUMENTS

| 756450 | 3/1971 | Belgium ................................ 73/49.2 |
| 1175502 | 8/1964 | Fed. Rep. of Germany ....... 73/49.2 |
| 1200619 | 9/1965 | Fed. Rep. of Germany ....... 73/49.2 |
| 1264179 | 3/1968 | Fed. Rep. of Germany ....... 73/49.2 |
| 1150248 | 6/1973 | Fed. Rep. of Germany ....... 73/49.2 |

Primary Examiner—Stewart J. Levy
Assistant Examiner—Joseph W. Roskos
Attorney, Agent, or Firm—Charles R. Wilson

[57] ABSTRACT

A storage tank system especially useful for storing liquid gasoline comprises a rigid inner tank encased by a flexible outer jacket to form a closed space, detecting liquid in the closed space and non-visual leak detection means associated with the closed space. The system results in a storage facility which is less likely to lose its stored liquid to the environment due to a slow leak or a sudden large leak such as is possible with an earthquake. The system is monitored for leakage in a reliable yet economical fashion.

19 Claims, 4 Drawing Figures

STORAGE TANKS WITH SECONDARY CONTAINMENT MEANS AND NON-VISUAL LEAK DETECTION MEANS

This application is a continuation-in-part of "Storage Tanks Having Secondary Containment Means," Ser. No. 06/740,869, filed June 3, 1985, now U.S. Pat. No. 4607,522 which is a continuation-in-part of Ser. No. 544,013 "External Jacket System As Secondary Containment For Storage Tanks," filed Oct. 21, 1983, now U.S. Pat. No. 4,523,454 and Ser. No. 580,800 "Storage Tank Systems," filed Feb. 6, 1984, now U.S. Pat. No. 4,524,609 which is a continuation-in-part of Ser. No. 06/544,012, filed Oct. 21, 1983, now abandoned.

This invention relates to liquid storage tank systems. More particularly the invention relates to storage tank systems having secondary containment means and non-visual leak detection means based on detecting liquid.

BACKGROUND OF INVENTION

Storage tanks are used throughout the world for storing various liquids in bulk form. In particular, storage tanks are used extensively for the storage of liquid gasoline at retail gasoline stations. Necessarily, these stations are in populated areas and, therefore, there is always a danger associated with leaks from the tanks. Leaked gasoline poses a hazard to the environment as well as an obvious health hazard. The known problem is particularly troublesome in that gasoline storage tanks are usually buried underground and any leaks which develop are normally very slow initially.

Underground storage tanks are particularly troublesome in those areas that are prone to earthquakes. Typical underground storage tanks are constructed of metal or fiberglass reinforced resin. Any earthquake is likely to cause a crack in the tank with a consequent leak. If the leak is slow, the same problems as above discussed exist. If the leak results in a large sudden loss, the problem is readily detected, but only after it is too late.

The problems associated with the present underground storage tanks are well known. Various attempts have been made to alleviate the problems. In my U.S. Pat. No. 4,523,454 there is described a liquid storage tank system using a flexible jacket for secondary containment means and various leak detection means associated with a closed space between the storage tank and flexible jacket. The leak detection means monitors for leaks of the inner tank and/or jacket. One described leak detection means comprises detecting fluid in the closed space and a standpipe/sight glass in communication with the closed space for observing any change in level or color of the detecting fluid. While such a detection means is economical and reliable, there are various drawbacks associated with it. For example, a standpipe must be properly installed and maintained. Additionally, the system can be tampered with by a service station owner who is not concerned with what he may view as inconsequential leaks. A system having the advantages of the detecting fluid concept without its disadvantages would fill a need.

There has now been discovered a tank storage system which improves upon the existing systems. The system of this invention is economical and provides a certain measure of protection not available previously.

SUMMARY OF THE INVENTION

The present invention is concerned with liquid storage tanks. The storage tanks comprise (1) a rigid inner tank having a fill pipe, dispensing line and, optionally, vent pipe (2) a flexible jacket encasing the inner tank to form a closed space, (3) detecting liquid between the inner tank and flexible jacket and (4) non-visual leak detection means associated with the closed space for detecting leakage. Any leak which occurs in the inner tank or flexible jacket will cause a change in level of detecting liquid which will be detected by the non-visual leak detection means.

DETAILED DESCRIPTION OF THE INVENTION

While the description which follows describes the invention in terms of its use with underground gasoline storage tanks, it should be understood the invention has applicability for other uses as well. For example, storage tanks used for storing liquids other than gasoline can utilize the present invention. However, the invention lends itself particularly well to underground tanks used for storing liquid gasoline and, therefore this preferred use is described in the following paragraphs.

Figure 1:
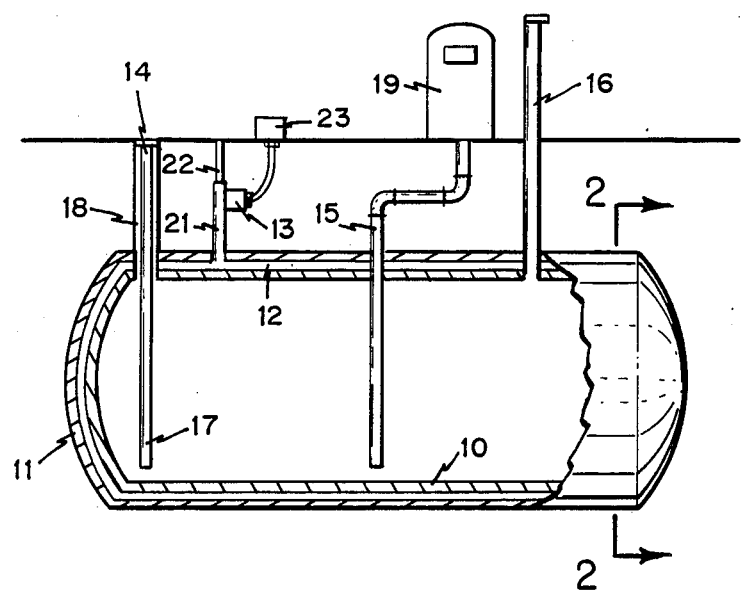
FIG. 1 is a side view, partially in section, of the improved storage tank system wherein a non-visual leak detection means is used for detecting leakage.
Figure 2:
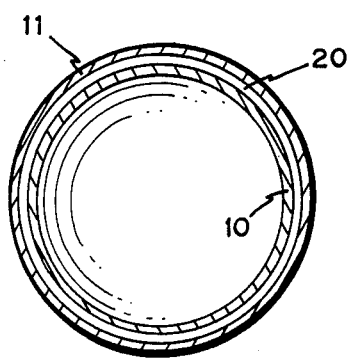
FIG. 2 is a cross-section view taken along lines 2—2 of FIG. 1.

With reference to FIG. 1, the present invention comprises a rigid inner tank 10, a flexible jacket 11 encasing the inner tank 10 to form a closed space, detecting liquid 12 filling the closed space, and non-visual leak detection means 13 associated with the closed space and the detecting liquid. The rigid inner tank 10 is made of metal such as steel or fiberglass reinforced resin material. Such tanks are well known and are commonly used for storage of various liquids. Connected to the inner tank 10 are a fill pipe 14 communicating with the ground surface, dispensing line 15 for withdrawing gasoline and vent pipe 16.

The fill pipe 14 provides as its obvious function the means by which gasoline can be pumped into the inner tank from an outside source, e.g. a tank truck. As illustrated in FIG. 1, fill pipe 14 comprises a line 17 through which gasoline flows to the inner tank 10 and a space 18 within the fill pipe which acts as a vapor recovery line. A gasoline is pumped into the inner tank, gasoline vapors which are formed are sucked through the space 18 back to the tank truck for recovery. This reduces the amount of gasoline vapors which would otherwise be vented to the atmosphere or remain in the inner tank preventing the tank from being filled completely with gasoline. As used throughout here, the term "fill pipe" connotes the pipe by which gasoline is pumped to the tank. It can be single pipe, but more often has vapor recovery means associated with it and is often referred to as a vapor recovery fill line. As shown in FIG. 1, line 17 extends into the inner tank 10 with its end near the bottom.

Dispensing line 15 is used for withdrawing gasoline and delivering it to the consumer through gasoline dispenser 19. While not illustrated in FIG. 1, a pump is positioned within the inner tank, dispensing line or gasoline dispenser for pumping gasoline to the dispenser. The bottom of the dispensing line 15 is in close proximity with the bottom of inner tank 10. The vent pipe 16 is optional, though preferred, and merely provides means by which gasoline vapors resulting primarily from a filing operation can be vented to atmosphere. The opening to the atmosphere is normally substantially off ground level for safety reasons. All the aforementioned pipes and lines are securely attached to the rigid inner tank by known means. While the pipes and lines are shown in FIG. 1 as entering the tank at different locations, they could be bundled together and enter the tank at one location. The pipes and lines could also communicate with the interior of the storage tank through an entry way or man way located on the tank. The exact location or number of accessory pipes and lines are not important to this invention; it only being necessary the necessary flling, dispensing and venting functions be provided for.

Jacket 11 is constructed of a flexible material of sufficient strength to contain the gasoline in case of a leak. The jacket can be made of a synthetic polymeric material, including an elastomeric material such as rubber, e.g. Buta-n, neoprene, and fluoroelastomer, e.g. Viton, polyester, e.g. vinylesters, polyethylene (preferably a low density polyethylene), polypropylene, polyvinylchloride, polyurethane, polyepoxie and various fiber reinforced, fabric and vinyl backed sheets of any of the foregoing materials as well as a material constructed of two or more of the foregoing materials, e.g. fluoroelastomer coated polyethylene. The listed materials used in construction of the jacket are not all inclusive, but only illustrative of some of the materials that can be used. Preferably, the jacket is made of at least one material which is gasoline impervious. The shape of the jacket 11 is such that it encases the rigid inner tank 10 to form a closed space between said jacket and the inner tank. Preferably, the jacket is sized to hold up to 200% of the inner tank's contents.

The jacket is provided with at least one opening for allowing the fill pipe 14, dispensing line 15 and vent pipe 16 to pass there through. The method by which the pipes and dispensing line are attached to the jacket is not important to the invention herein. Thus, any means suitable for providing a sealed connection can be used.

The space 20 between the inner tank 10 and the jacket 11 is closed. Detecting liquid 12 at least partially fills the closed space. Water is the preferred detecting liquid, though other environmentally acceptable liquids can be used. An anti-freeze can be added to the preferred detecting liquid in climates where freezing is a problem.

Any of various non-visual leak detection means 13 is in communication with the closed space for the purpose of detecting a change of level of detecting liquid in the closed space. The leak detection means can be positioned in the closed space or in a location which is in communication with the closed space, e.g. the access tube 21. In either case, responses from the leak detection means are relayed to a location for periodic or continuous reading. A significant change of level of the liquid as pre-determined allowing for temperature and jacket/tank movements indicates a leak in the inner tank or flexible jacket has occurred. Leakage through either will be detected in sufficient time to prevent damage to the environment. Preferably, the leak detection means is read in a location remote from the storage tank system, e.g. in a service station office area or a central monitoring station. Periodic checking of the monitoring system or activation of an alarm system will alert an operator as to a leakage problem. Vent line 22 is provided for the most efficient operation of the system.

Various non-visual monitoring means are in widespread use in industries such as high pressure boilers and high pressure fluid transfer lines. For example, the leak detection means can be based on detecting a pre-determined change of pressure associated with a drop in liquid level. Differential pressure switches and transducers are examples of means which are capable of detecting a change of pressure and transmitting it into an audible or visual signal. As another example, float switches which detect a change of level of liquid by movement of a float can transmit the detected change into a signal. Optic devices are also known which can be used herein for non-visual leak detection of the detecting liquid level. Still another leak detection means is based on a set of conductive points positioned in the detecting liquid and wired so that a change in the presence of liquid will interrupt an electric circuit to set off the alarm.

Figure 3:
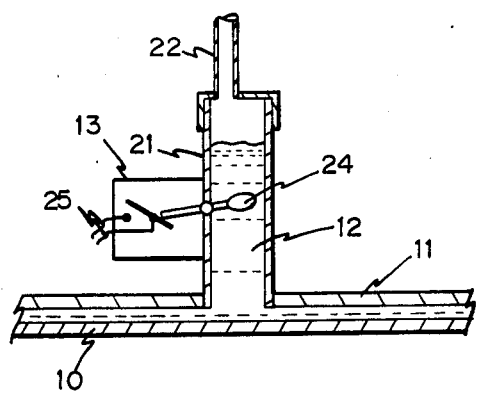
FIG. 3 is a side view, partially in section, of a level sensing means properly positioned in a storage tank system of this invention.

With reference to FIG. 3, there is shown a level detector 24 positioned in the access tube 21 which is in communication with closed space between the inner tank 10 and flexible jacket 11. Level detectors are well known and used extensively in various industries. Generally, they work by the float detecting a change in liquid level 12 and this change causing an electric circuit 25 to either be broken or connected. A change in the flow of electricity through the circuit w11 set off an audible or visual alarm as above discussed.

Figure 4:
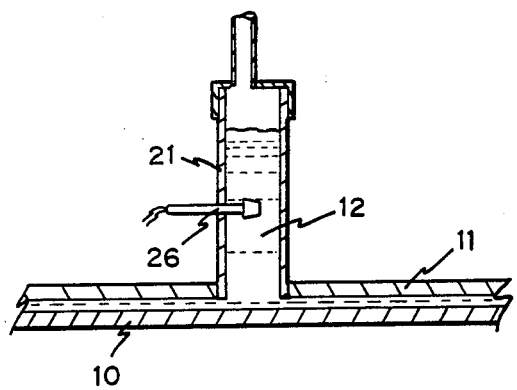
FIG. 4 is a side view, partially in section, of a probe properly positioned in a storage tank system of this invention.

Other non-visual leak detection means which do not operate on a change of liquid level principle are also well known and useful in this invention. For example, in FIG. 4 a probe 26 is positioned in the closed space occupied by detecting liquid 12. The probe 26 is capable of detecting any preselected liquid, e.g. gasoline. Various probes are known. In one type, electric wires are encased in a gasoline soluble covering. Leaked gasoline will eventually dissolve the coverings and cause a short circuit between the wires. This type of probe is best for detecting a leak in the storage tank. Any such leak will cause drainage of the detecting liquid into the storage tank. Subsequent filling of the tank with gasoline will also fill the closed space with gasoline which will be detected by the probe.

While the above described non-visual leak detection means are readily available and satisfactorily perform in this invention, it should be understood other non-visual leak detection means can be used. It is not important how such means operate, it only being important that a reliable means be used to detect a change in level of detecting liquid and the change so detected be transmitted to a receiving station.

Most preferably, the closed space between the inner tank and jacket is completely filled with the detecting liquid. This allows for the most accurate determination of whether a leak has occurred. However, the closed space can be only partially filled, though preferably at least half-filled. When the closed space is only partially filled with detecting liquid, a pressure or vacuum can be maintained over the liquid and the non-visual leak detection means associated either with the liquid as described above with respect to the preferred embodiments or with the space above the liquid. Alternatively, the closed space is filled with detecting liquid and the access tube 21 completely or partially filled with detecting liquid. In all embodiments of the invention, detecting liquid at least partially fills the closed space between and the inner tank and the jacket and the non-visual leak detection means either directly or indirectly monitors the level of detecting liquid.

In operation, the inner tank is filled with gasoline in normal fashion. Any leakage in the tank or jacket will cause a change in level of the detecting liquid. This change in level will be detected by the leak detection means. Preferably, alarm means will alert an attendant to the problem so that iamediate corrective action can be taken. A large leak in the inner tank such as could be caused by an earthquake will result in a substantial loss of stored liquid from the tank. However, the flexible nature of the jacket will withstand the sudden stress caused by the earthquake and confine the leaked gasoline. Subsequent clean-up can occur as time permits without concern for the safety of the environment or the health of the residents. A leak in the jacket will cause the detecting liquid to flow to the ground surrounding the storage tank system. However, because of the nature of the detecting liquid, water or an environmentally acceptable liquid, no damage will occur and an attendant will be alerted to the problem.

What is claimed is:

1. An underground storage tank system for liquids having secondary containment capability and leakage detection capability, comprising:
   (a) a rigid inner tank for storing the liquid, having fill pipe and dispensing line;
   (b) a flexible jacket capable of withstanding sudden stresses without breaking and having sufficient strength to contain any liquid leaked from the rigid inner tank, said flexible jacket encasing the inner tank so as to form a closed space between the tank and the jacket;
   (c) detecting liquid which at least partially fills the closed space; and
   (d) non-visual leak detection means associated with the closed space for detecting any change in level of detecting liquid.

2. The storage tank system of claim 1 wherein the leak detection means is capable of detecting a change in level of detecting liquid significantly large enough to have been caused by a leak in the inner storage tank or the flexible jacket.

3. The storage tank system of claim 2 wherein the leak detection means is a pressure change sensor.

4. The storage tank system of claim 3 wherein the leak detection means is a pressure transducer which is set to detect a change in pressure of detecting liquid caused by the significant change in level of detecting liquid.

5. The storage tank system of claim 2 wherein the leak detection means is a liquid level change detector comprising a float mechanism.

6. The storage tank system of claim 2 wherein the leak detection means is a probe which is capable of sensing the presence of selected liquids.

7. The storage tank system of claim 6 wherein the probe is capable of sensing the presence of liquid stored in the inner tank.

8. The storage tank system of claim 7 wherein the probe is capable of sensing the presence of gasoline.

9. The storage tank system of claim 2 wherein the leak detection means is a set of conductive points whereby a drop in level of detecting liquid causes an electrically conductive path between the conductive points to be interrupted.

10. The storage tank system of claim 2 wherein the leak detection means is an optic device which senses the absence of detecting liquid.

11. The storage tank system of claim 1 wherein the detecting liquid is water.

12. The storage tank system of claim 11 wherein the flexible jacket is made of a gasoline impervious material.

13. The storage tank system of claim 1 wherein the flexible jacket is made of a synthetic polymeric material.

14. The storage tank system of claim 13 wherein the flexible jacket is made of elastomeric material.

15. The storage tank system of claim 1 wherein the leak detection means is connected with an alarm system whereby a significant change in level of detecting liquid will be sensed by the leak detection means and the alarm system actvated.

16. The storage tank system of claim 1 wherein the leak detection means is positioned within the closed space.

17. The storage tank system of claim 1 wherein the leak detection means is positioned in a location which is in communication with the closed space.

18. The storage tank system of claim 1 wherein the detecting liquid at least fills about one-half of the closed space.

19. The storage tank system of claim 18 wherein the detecting liquid completely fills the closed space.

* * * * *